US 12,349,685 B2

(12) United States Patent
De Winter et al.

(10) Patent No.: US 12,349,685 B2
(45) Date of Patent: Jul. 8, 2025

(54) DEVICE AND METHOD FOR SEPARATING TISSUE FROM AN INTESTINE

(71) Applicant: Van Hessen Holding B.V., Nieuwerkerk a/d Ijssel (NL)

(72) Inventors: Thomas Jozef S. De Winter, Laarne (BE); Frederik Marcel D. De Winter, Zele (BE); Jürgen Johannes Antonius Thomas Smits, Den Dungen (NL)

(73) Assignee: Van Hessen Holding B.V., Nieuwerkerk a/d Ijssel (NL)

( * ) Notice: Subject to any disclaimer, the term of this patent is extended or adjusted under 35 U.S.C. 154(b) by 286 days.

(21) Appl. No.: 17/796,103

(22) PCT Filed: Feb. 4, 2021

(86) PCT No.: PCT/EP2021/052589
§ 371 (c)(1),
(2) Date: Jul. 28, 2022

(87) PCT Pub. No.: WO2021/156327
PCT Pub. Date: Aug. 12, 2021

(65) Prior Publication Data
US 2023/0095761 A1 Mar. 30, 2023

(30) Foreign Application Priority Data

Feb. 5, 2020 (NL) ..................................... 2024837

(51) Int. Cl.
A22C 17/14 (2006.01)
A22B 5/00 (2006.01)
(52) U.S. Cl.
CPC ............ A22B 5/0005 (2013.01); A22C 17/14 (2013.01)

(58) Field of Classification Search
CPC ............................ A22B 5/0005; A22C 17/14
(Continued)

(56) References Cited

U.S. PATENT DOCUMENTS 3,290,722 A * 12/1966 Norks ..................... A22C 17/14
452/123
3,882,571 A 5/1975 Evers et al.
(Continued)

FOREIGN PATENT DOCUMENTS

CN 201046558 Y 4/2008
CN 108697104 A 10/2018
(Continued)

OTHER PUBLICATIONS

Chinese Office Action, Application No. 2021800261137, dated Feb. 2, 2023, 2 pages.
(Continued)

Primary Examiner — David J Parsley
(74) Attorney, Agent, or Firm — Hoffmann & Baron, LLP

(57) ABSTRACT

A tissue separating device for separating an intestine from a cluster of organs harvested from an animal includes a guiding device having at least one guiding surface configured to contact the intestine, and a tissue severing device configured to provide a separation in the tissue close to the intestine. The guiding device further includes a first guiding member and a second guiding member being movable with respect to each other to define a gap configured to accommodate said tissue. The gap has a variable gap width. The tissue severing device is configured to be operative in the gap, where the tissue separating device further includes a resilient member configured to exert a force on at least one of the first guiding member and the second guiding member, the resilient member force driving the first guiding member and the second guiding member towards each other.

24 Claims, 5 Drawing Sheets

(58) Field of Classification Search
USPC .......................................................... 452/106
See application file for complete search history.

(56) References Cited

U.S. PATENT DOCUMENTS

| | | | | | |
|---|---|---|---|---|---|
| 3,918,124 | A | * | 11/1975 | Evers | A22B 5/18 |
| | | | | | 452/123 |
| 4,063,331 | A | * | 12/1977 | O'Neal | A22C 17/14 |
| | | | | | 452/123 |
| 4,998,324 | A | | 3/1991 | Nagatomo | |
| 10,398,150 | B2 | | 9/2019 | Baauw | |
| 2002/0102932 | A1 | | 8/2002 | Minemura et al. | |
| 2013/0219726 | A1 | | 8/2013 | Rosu et al. | |
| 2015/0017895 | A1 | | 1/2015 | Al-Laham | |

FOREIGN PATENT DOCUMENTS

| | | |
|---|---|---|
| DE | 348046 C | 2/1922 |
| GB | 382350 A | 10/1932 |
| GB | 1080417 | 8/1967 |
| JP | 2002-095406 A | 4/2002 |
| NL | 2015948 B1 | 7/2017 |
| WO | 2013/125947 A1 | 8/2013 |
| WO | 2017/09957 A1 | 6/2017 |

OTHER PUBLICATIONS

Columbia Patent Application No. NC2022/0011380, Office Action, Feb. 23, 2024, pp. 12.

Chinese Patent Application No. 2021800261137, Office Action, Dec. 19, 2023, pp. 3.

\* cited by examiner

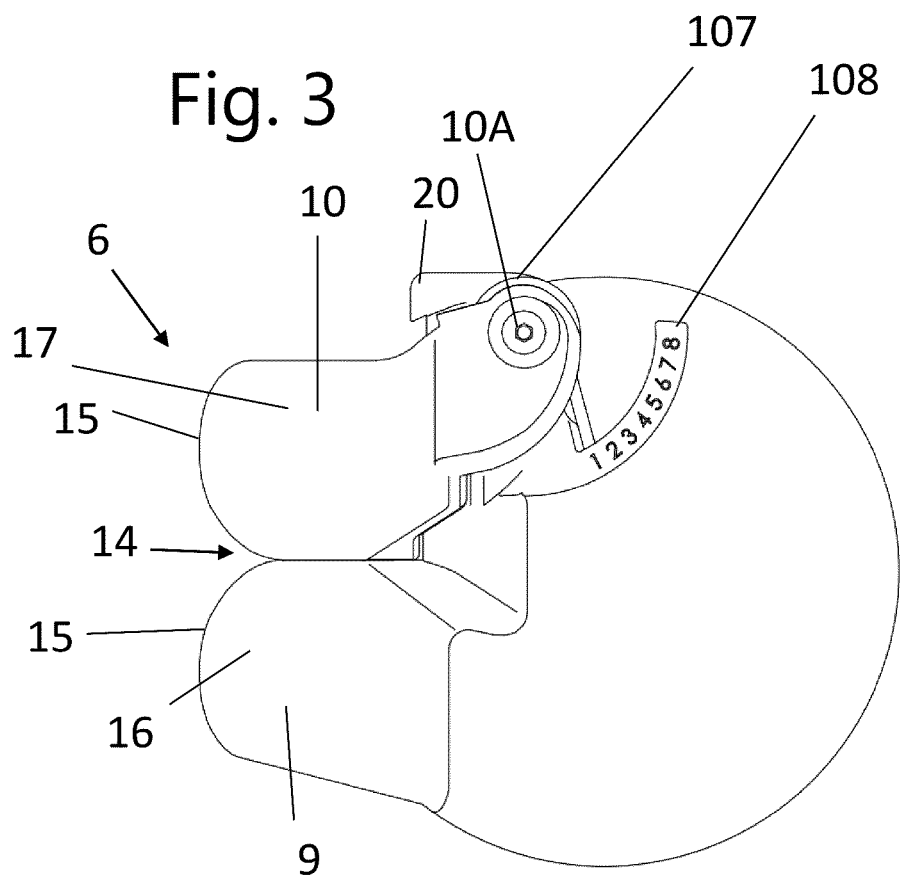

of the invention relates to the field of harvesting intestines
DEVICE AND METHOD FOR SEPARATING TISSUE FROM AN INTESTINE

CROSS-REFERENCE TO RELATED APPLICATIONS

This application is the National Stage of International Application No. PCT/EP2021/052589, filed Feb. 4, 2021, which claims the benefit of Netherlands Application No. 2024837, filed Feb. 5, 2020, the contents of which is incorporated by reference herein.

FIELD OF THE INVENTION

The invention relates to the field of harvesting intestines from a cluster of organs and tissue from an animal. More specifically, the invention relates to a device and method for separating tissue from an animal intestine in an intestine harvesting process.

BACKGROUND OF THE INVENTION

Animal intestines, in particular the small intestines as connected between the stomach and the large intestines, when properly processed, are a valuable and well-appreciated natural product which can be used, for example, as casing, or case, or skin, of sausages, and for other purposes. This is especially true for intestines of porcine, ovine or bovine.

In an animal slaughtering process, a cluster of organs is removed from a body cavity of an animal. Next, organs and tissue are separated from the cluster to be further processed.

In one of these separating steps, at least a part of the cluster comprising an intestine and at least one other organ, such as the stomach, and tissue, is brought to an intestine separating station for separating the intestine from a remainder of the cluster, or part of the cluster. The cluster or cluster part may be hanging from a support of a mechanical transport device, such as a conveyor. The conveyor, which may be an endless conveyor, comprises a series of supports, each carrying a cluster or cluster part. By moving the supports continuously, or intermittently, one cluster or cluster part at a time is presented at the intestine separating station. The intestine separating station may be part of a so-called gut room for processing intestines.

Traditionally, at a separating station, a person separates the intestine by hand. The person holds a knife, comprising a handle and a one-sided elongated cutting blade, such as a razor blade, connected to the handle, in his or her hand. The knife and the intestine, while still connected to the cluster or cluster part, are moved relative to each other, whereby the knife moves closely along the intestine near its outer surface, and in its longitudinal direction.

In the intestine separating process, the intestine needs to be separated from deformable fatty tissue in which blood vessels leading to and from the intestine are embedded. Such blood vessels are also indicated by the term "whiskers". In the harvesting of the intestine, it needs to be ensured that a separation or cut is made as closely as possible to the intestine to remove the fatty tissue as much as possible, and to obtain an intestine having whiskers with a shortest possible length, without damaging the intestine.

The person, or operator, handling the knife must be educated and experienced in performing this task, which takes a relatively long time in practice.

The required working position for the operator's hand holding the knife is quite unnatural and uncomfortable, and may lead to symptoms in the hand, arm and related body parts of the operator.

NL2015948C2 discloses an intestine separating device for separating fatty tissue from an intestine harvested from an animal. The intestine separating device comprises guiding device defining a gap with a tissue severing device operative therein. The fatty tissue connected to the intestine is accommodated in the gap and stretched by the guiding device. The tissue severing device severs the fatty tissue from the intestine, leaving whiskers with a minimal length.

The guiding device comprises two guiding members or fingers, with a distance between the guiding members that is controlled by an operator by way of hand controls. The hand controls are biased towards a fully open position starting by a biasing force provided by a spring member. Moving the hand controls towards each other moves the guiding members closer to each other. The operator controls the distance between the guiding members by squeezing the hand controls towards each other against the biasing force, using his or her hand. In use, the operator decreases the distance between the guiding members from the distance corresponding to the fully open starting position to the desired distance based on tactile feedback from the device provided by the interaction between the device and the intestine being processed. This allows the operator to process intestines of slightly different sizes, but also leads to operator dependency of the harvested intestine quality and fatigue of the operator's hand.

SUMMARY OF THE INVENTION

It would be desirable to provide a tissue separating device and method for separating tissue from an intestine with a reduced operator dependency and with reduced strain on the operator. Reducing operator dependency can allow less skilled workers to produce consistent results of high quality, while reduced strain on the operator may allow for faster working, less mistakes resulting in loss of product, and/or longer working intervals in between breaks. Reducing the operator dependency may also involve incorporation of the tissue separating device in an automated system, wherein the tissue separating device is connected to a mechanical handling device such as a robotic arm.

To address one of more of these concerns, in a first aspect of the invention, a tissue separating device is provided for separating an intestine from a cluster of organs harvested from an animal, in particular porcine, ovine or bovine, the intestine being connected to the remainder of the cluster through tissue, the tissue separating device comprising:
  a guiding device having at least one guiding surface configured to contact the intestine;
  a tissue severing device configured to provide a separation in the tissue close to the intestine,
  wherein the guiding device further comprises a first guiding member and a second guiding member being movable with respect to each other to define a gap configured to accommodate said tissue, the gap having a variable gap width, wherein the tissue severing device is configured to be operative in the gap, wherein the tissue separating device further comprises a resilient member configured to exert a resilient member force on at least one of the first guiding member and the second guiding member, the resilient member force driving the first guiding member and the second guiding member towards each other.

The gap may be open(ed) when the first guiding member is at a distance from the second guiding member. The intestine separating device further allows the gap to be closed, or almost closed, when the first guiding member rests against the second guiding member, or almost rests against the second guiding member, leaving a minimum distance between the first and second guiding members.

In use, an intestine is moved along the separating device to make tissue move into the gap towards a tissue separation location in the gap where the tissue severing device is operative. In the gap, by friction generated between, on the one hand, the first guiding member and the second guiding member and, on the other hand, the tissue, the tissue is tensioned near the separation location to provide a reliable and easy separation.

A varying gap width allows for an adjustment of the actual gap width to an actual thickness of the tissue moving along the gap towards the tissue separation location, the thickness direction extending in the width direction of the gap. The thickness of the tissue may vary not only from one intestine of one animal to another intestine from another animal, but also when processing one intestine, where the tissue may have varying thickness at different locations along the intestine. The gap width is determined by the interplay of the forces exerted on at least one of the guiding members by the tissue and by the resilient member. The resilient member may be a spring such as a torsion spring that provides a force that tends to decrease the gap width by forcing the guiding members towards each other. The force exerted by the resilient member may be adaptable. It the resilient member is a spring, the force exerted by the resilient member may be adapted by changing the pre-tension of the spring.

The variable width of the gap, in which the tissue is moving to reach the separation location, by virtue of the first and second guiding members being movable relative to one another, allows the tissue to reach the separation location without getting jammed, which jamming may happen in a gap with a fixed width which would be too narrow for some parts of the tissue to pass, whereby the separation location cannot be reached. Also, the variable width of the gap allows the tissue to reach the separation location while generating sufficient friction between the tissue and the first and second guiding members without the friction being too low or even zero in a gap, which too low a friction may occur in a gap with a fixed width which would be wider than the thickness of at least some parts of the tissue.

In contrast to the device of NL2015948C2, the resilient member forces the guiding members towards each other instead of away from each other. As a result, the gap width in use is determined by the interplay between the resilient member force and the force exerted by the intestine alone, rather than incorporating a squeezing action of an operator. Allowing the gap width to be determined by operator independent quantities alleviates the task of the operator and ensures consistent results. Operator dependency is thus reduced and strain on the operator is reduced, especially on the hand and arm muscles of the operator.

In an embodiment of the tissue separating device, the first guiding member and the second guiding member are rotatable relative to each other to vary the gap width, allowing for reliable positioning of the guiding members. In a further embodiment of the tissue separating device, the first guiding member is fixed with respect to the tissue severing device and the second guiding member is movable with respect to the tissue severing device, allowing a relatively simple construction, especially of the first guiding member. In yet a further embodiment of the tissue separating device, the second guiding member is rotatable around a guiding member rotation axis. In yet a further embodiment of the tissue separating device, the resilient member is configured to exert a force on the second guiding member such that the second guiding member is forced towards the first guiding.

In an embodiment of the tissue separating device, the gap formed by the first guiding member and the second guiding member comprises a tapering tissue inlet area. In a further embodiment of the tissue separating device, the first guiding member and the second guiding member each comprise a rounded end portion at a tissue inlet area of the gap.

A tapering tissue inlet area, i.e. a tapering in the area of the gap where tissue enters the gap, promotes an easy capture of the tissue and a smooth moving of the tissue into the gap, even if the tissue would sway as a result of its movement. A similar effect is obtained by designing the first and second guiding members to have a rounded end portion.

In an embodiment of the tissue separating device, the first guiding member comprises a first guiding surface, and the second guiding member comprises a second guiding surface, wherein the first guiding surface and the second guiding surface are configured to at least partially contact the intestine.

The first guiding surface and the second guiding surface have a function of providing a predetermined distance between, on the one hand, the separation location in the tissue as obtained by the tissue separating device, and the intestine surface on the other hand, to ensure that the tissue is separated from the intestine at a short distance from the intestine without damage to the intestine. The first guiding surface and the second guiding surface provide their function reliably even at different gap widths.

In an embodiment of the tissue separating device, the first guiding member comprises a first side facing a second side of the second guiding member, the first side and the second side together defining the gap.

Said first side and second side may be substantially flat faces. These flat faces may be extending, when not in use of guiding tissue between them, substantially parallel to each other or, when in use of guiding tissue between them, extending at an angle of at most 20° relative to each other when seen in a direction at right angles to a direction of movement of the tissue through the gap. Thus, at least a part of the first side and second side can, in use of the intestine separating device, be in contact with the tissue to generate a friction force to promote an optimum separation in the tissue made by the tissue separating device.

In an embodiment of the tissue separating device, the tissue separating device comprises a stop member for limiting a movement of the first guiding member and the second guiding member towards each other. Additionally or alternatively, the tissue separating device may comprise a stop member for limiting a movement of the first guiding member and the second guiding member away from each other. Such stop members limit the range of relative motion of the guiding members and set a minimum and/or maximum gap width. This may prevent damage to the tissue and/or the intestine due to jamming of the tissue in the gap in case of a gap width that is too small and prevents damage to the tissue or tissue separating device if the gap width becomes too large.

In an embodiment of the tissue separating device, the tissue severing device comprises a rotatably driven cutting member.

In use of a device for separating an intestine from a cluster of organs harvested from an animal, some 20 meters of intestine are to be processed in less than about 10 seconds time. Assuming a continuously ongoing operation, 8 hours of use of the intestine separating device means providing a cutting length of the tissue separating device of more than 57 kilometers. By providing a rotatably driven cutting member, a relatively long operational time of the tissue separating device can be reached, contrary to e.g. using a stationary cutting member such as a razor blade.

In a further embodiment of the tissue separating device, the cutting member is circle knife having a peripheral cutting edge, in particular, but not limited to, a plain (i.e. non-serrated) cutting edge.

In practice, such a circle knife has shown to have a high performance, in particular in terms of high operational time, low wear, easy replacement, etc.

In yet a further embodiment of the tissue separating device, part of the cutting edge extends across the gap. This ensures that the tissue is severed close to the intestine, minimizing whisker length.

In yet a further embodiment of the tissue separating device, the cutting member extends in a plane extending at an angle between 20° and 60°, in particular about 45°, to the guiding surface of the guiding device.

Positioning the plane of the rotatable cutting member at an angle to the guiding surface of the guiding device implies that in the separating process the tissue separated from the intestine diverges from the intestine. Thereby the intestine is drawn against the guiding surface(s) of the guiding device to closely follow the guiding surface(s) to obtain a constant small distance between the surface of the intestine and the actual separation location in the tissue. This ensures a constant and small whisker length.

In an embodiment of the tissue separating device, the tissue separating device comprises a fluid supply duct configured to supply fluid to the tissue severing device.

The supply of fluid to the tissue severing device, in particular the supply of hot water having a temperature of between 20° C. and 60° C., in particular 40° C., has a cleaning effect on the tissue severing device, to remove tissue residues from the tissue severing device. The relatively high temperature of the water prevents the tissue residues from solidifying and becoming adhered to the tissue severing device, which would impede its function. In addition, the water may be supplied to at least part of the area of the gap, in particular to the area of the gap where the tissue severing device operates on the tissue, to provide a lubricating effect to enhance the passage of the tissue, and the severing action of the tissue severing device. The fluid may also comprise lubricating, cleaning or disinfecting additives that enhance the effectiveness of the fluid. The fluid may also be used for cooling a motor or drivetrain driving the cutting member. The fluid may comprise additives improving the cooling effectiveness of the fluid. Alternatively, the tissue separating device may comprise a separate supply of cooling fluid. This fluid may be a liquid such as water with or without additives or a gas such as air. When a gas is used, this gas may be provided at a pressure that is greater than atmospheric pressure, such that the motor or drivetrain operates in a pressurized environment. This decreases the chances of any fluid reaching the motor or drivetrain.

In an embodiment of the tissue separating device, the cutting member is driven by an electric motor. The electric motor may be built into the tissue separating device and may be coupled directly to the cutting member. This allows efficient transfer of power to the cutting member and reduces complexity of the drivetrain. Further, no drive cables, pressurized hydraulic lines or pressurized air lines need to be connected to the tissue separating device, reducing weight and complexity of the tissue separating device and the lines connected to the tissue separating device, and stiffness of the lines connected to the tissue separating device. Alternatively, the motor may be external. The cutting member may then be driven using a drive cable or by using air, water or another fluid driving an internal turbine connected to the cutting member.

In a separate independent aspect of the invention, a method is provided for separating an intestine from a cluster of organs harvested from an animal, in particular porcine, ovine or bovine, the intestine being connected to the remainder of the cluster through tissue, the method comprising:

moving the intestine in its longitudinal direction relative to a guiding device;

guiding the tissue into a gap of the guiding device, wherein the guiding device comprises a first guiding member and a second guiding member defining the gap, and being relatively movable towards and away from each other to vary a width of the gap, wherein the first guiding member and the second guiding member are resiliently forced towards each other by a resilient member force, and wherein at least one guiding surface of the guiding device contacts the intestine;

allowing the tissue to exert a force on at least one of the first guiding member and the second guiding member, wherein the gap width is determined by the interplay between the resilient member force and the force exerted by the tissue; and providing, in the gap, a separation in the tissue close to the intestine.

In a further embodiment of the method, the first guiding member is rigidly mounted to a tissue separation device, wherein the second guiding member is movably mounted to the tissue separating device, wherein the resilient member force is provided by a resilient member which acts upon the second guiding member.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 3 shows a bottom view of a portion of a tissue separating device according to the invention, wherein a gap between a first guiding member and a second guiding member is closed.

DETAILED DESCRIPTION OF THE INVENTION

Figure 1:
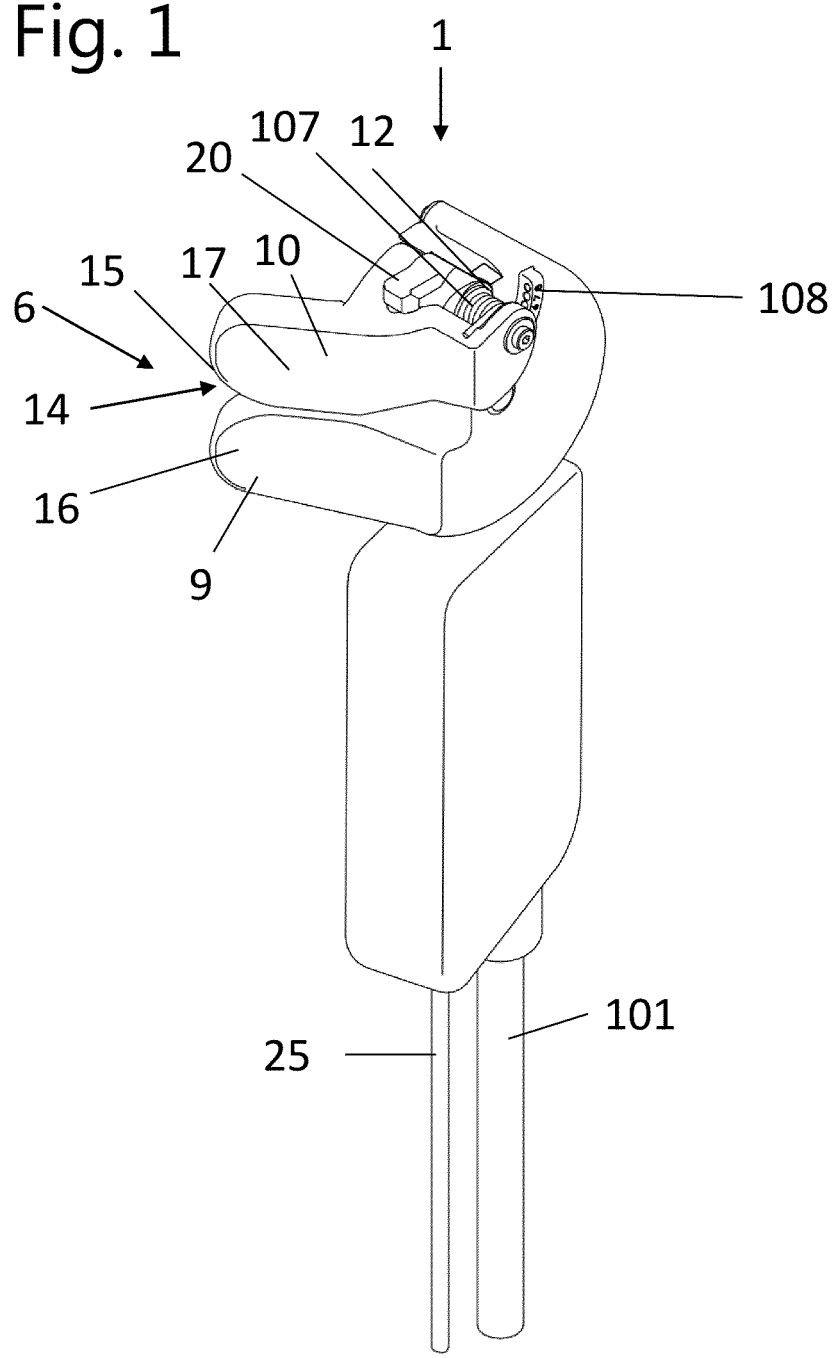
FIG. 1 shows a perspective view of an embodiment of a tissue separating device according to the invention.

A tissue separating device 1 according to the invention is shown in the figures. The tissue separating device 1 comprises a guiding device 6 that is configured to guide tissue 5 (FIG. 6) to a tissue severing device 8. The tissue severing device 6 is configured to separate tissue 5 from an intestine 2. Thereby, an intestine 2 may be separated from a cluster of organs 3 to which it is attached by the tissue 5. The intestine may be from any animal, in particular from a porcine, ovine or bovine animal.

The guiding device comprises a first guiding member 9 and a second guiding member 10, with a gap 11 of variable width between the first guiding member 9 and the second guiding member 10. The width of the gap 11 can change due to relative movement of the first and second guiding members 9, 10. This movement is controlled by a resilient member 12, which may be embodied as a spring, and which exerts a force that tends to drives the first and second guiding members 9, 10 towards each other. Tissue 5 is guided by the guiding device 6 through the gap 11 to the tissue severing device 8. The guiding device 6 comprises a tapering tissue inlet area 14 comprising rounded end portions 15 of the first guiding member 9 and the second guiding member 10, such that the tissue 5 may smoothly enter between the first guiding member 9 and the second guiding member 10.

The tissue separating device 1 comprises an internal fluid channel 110, that is configured to convey fluid from the fluid supply duct 25 to the rotatably driven cutting member 22. This fluid cleans, lubricates and/or disinfects the rotatably driven cutting member 22 during use of the tissue separating device 1.

Figure 2:
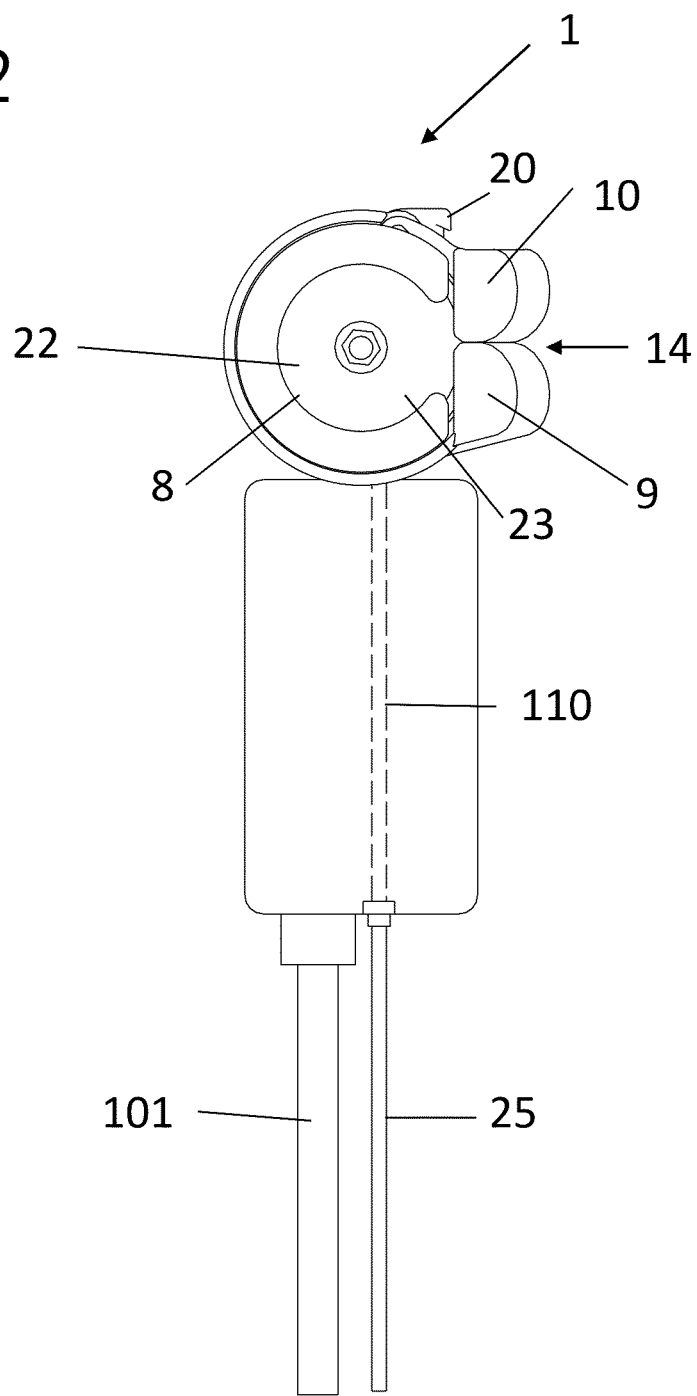
FIG. 2 shows a top view of the tissue separating device of FIG. 1.

FIG. 2 shows a top view of the tissue separating device 1. The tissue severing device 8 is a rotatably driven cutting member 22, more in particular a circle knife 23. The circle knife 23 is driven by an electric motor, which may be a three-phase electric motor being powered through three electric power wires 102 of a cable 101. The electric motor may be directly coupled to the rotatably driven cutting member 22. The electric motor is controlled via electric control wires 103. Electric power that is sent to the electric motor through the electric power wires 102 is controlled, e.g. through on/off control, via the electric control wires 103. The rotatably driven cutting member 22 extends in a plane extending at an angle between 20° and 60°, in particular about 45°, to the guiding surfaces 16, 17 of the guiding device 6.

Figure 4A:
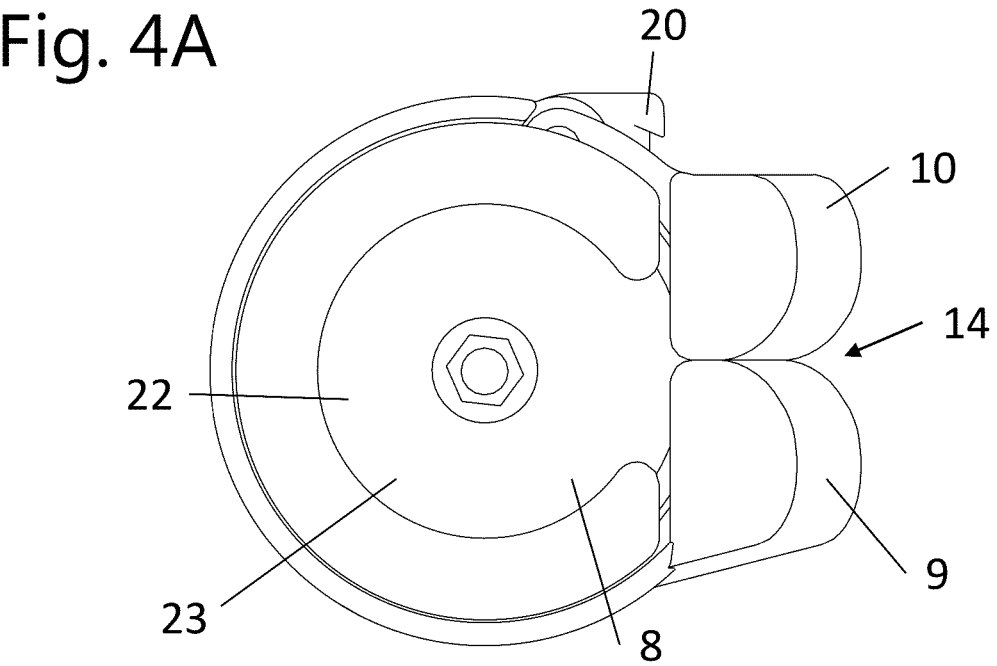
FIG. 4A shows a top view of a portion of a tissue separating device according to the invention wherein a gap between a first guiding member and a second guiding member is closed.
Figure 4B:
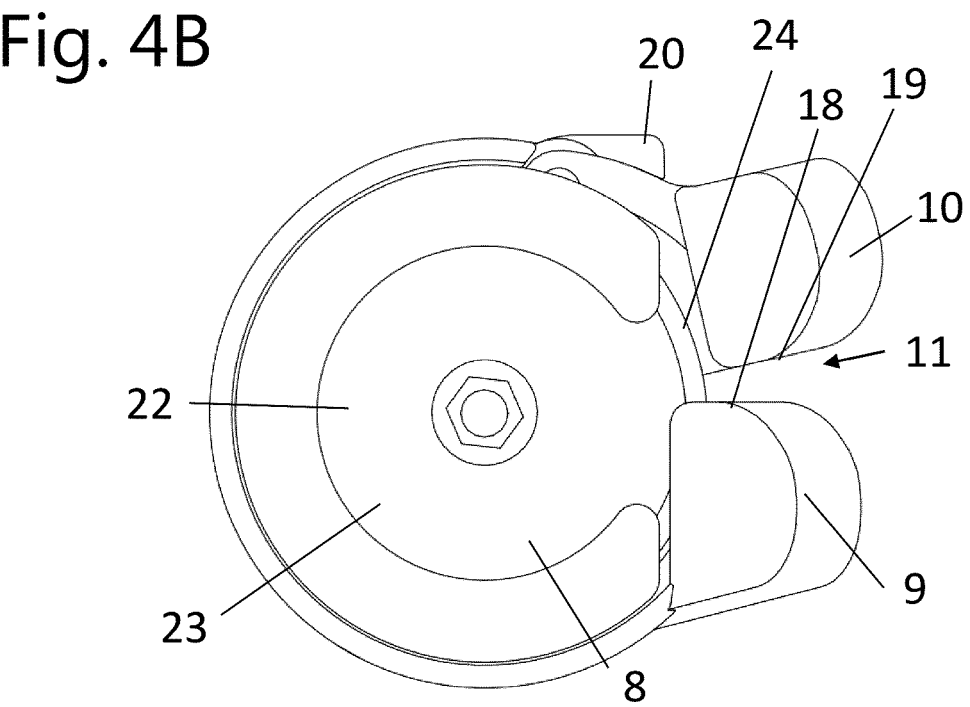
FIG. 4B shows the top view of the portion of the tissue separating device of FIG. 4A, wherein the gap is open.

FIGS. 3-4B show detail views of the head of the tissue separating device 1 with the gap 11 closed (FIGS. 3A and 4A) and with the gap 11 open (FIG. 4B). In the embodiment shown, the second guiding member 10 is rotatable around a guiding member rotation axis 10A and is forced towards the first guiding member 9 by a spring 107. The force exerted by the spring 107 on the second guiding member 10 can be adapted by changing the pre-tension of the spring 107 using a spring pre-tension adjuster 108 having predetermined pre-tension settings marked "1" to "8". Other means for adjustment may be present if another type of resilient member 12 is used instead of a spring 107. The properties of the intestine 2 and connecting tissue 5 of different animals may vary, for example among different species or different races within a species. Allowing the force exerted by the resilient member to be adjusted thus allows for adapting the tissue separating device 1 for use on different types of intestines, for example for intestines from different species of animals or different races of the same species.

Comparing FIGS. 3, 4A, and 4B shows that, due to the rotation of the second guiding member 10 with respect to the first guiding member 9 upon opening of the gap 11, the first side 18 and the second side 19 of the gap 11, respectively, extend at an angle relative to each other. This causes the gap 11 to have a tapered shape, narrowing towards the peripheral edge 24 of the circle knife 23. The angle increases with the gap width: if the gap is wider, the angle increases.

The tissue separating device 1 comprises a stop member 20 that limits how far the gap 11 may open by limiting the range of motion of the first guiding member 9 and the second guiding member 10 away from each other. In the depicted embodiment, the stop member 20 limits the movement of the second guiding member 10. This sets an upper limit to the width of the gap 11, such that it may be impossible or highly unlikely that a finger or other body part of a user of the tissue separating device 1 contacts the peripheral edge 24 of the circle knife 23. This decreases the risk of injury of the user.

The tissue separating device 1 may also comprise another stop member for limiting a movement of the first guiding member 9 and the second guiding member 10 towards each other. In the depicted embodiment, the first and second guiding members 9, 10 may touch each other, such that a separate stop member for limiting a movement of the first guiding member 9 and the second guiding member 10 towards each other is not necessary.

FIG. 4B shows that the peripheral cutting edge 24 partially extends across the gap 11, such that the severing action of the circle knife 23 is performed in the gap. The circle knife 23 has a plain peripheral cutting edge 24.

Figure 5:
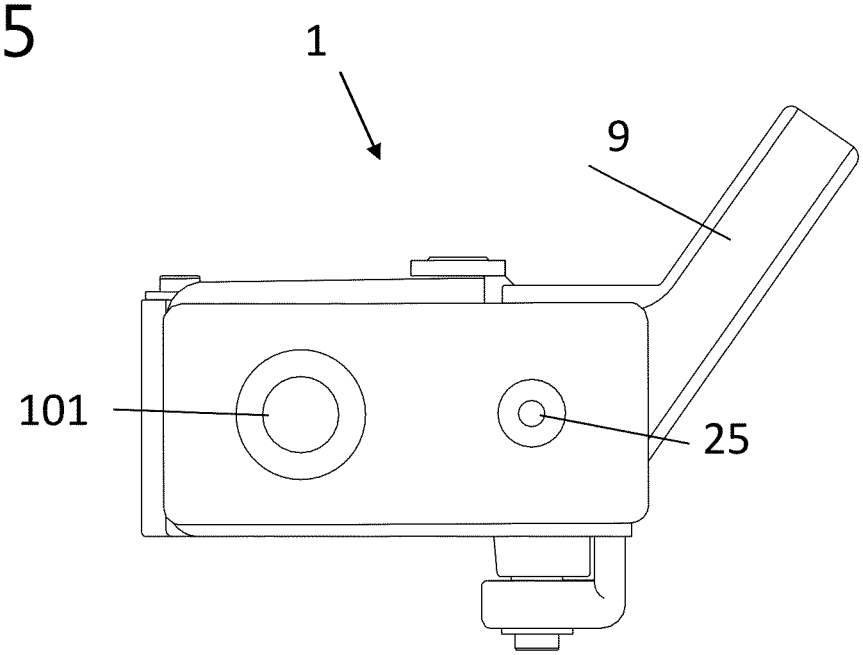
FIG. 5 shows a back view of an embodiment of a tissue separating device according to the invention.

FIG. 5 shows a back view of the tissue separating device 1, showing the connections to the three electric power wires 102 and the two electric control wires 103 in the electric cable 101, as well as a fluid supply duct 25. More or less electric power wires and electric control wires may be used in alternative embodiments according to the invention, e.g. when the electric motor is a one-phase AC motor, or a DC motor, for example a brushless DC motor.

Figure 6:
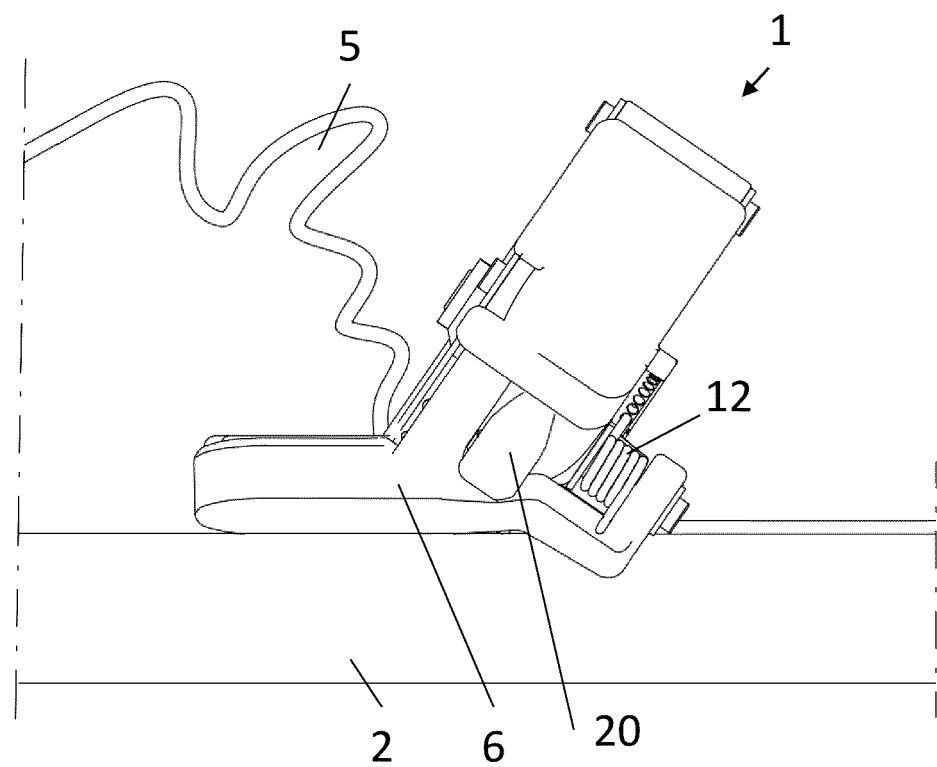
FIG. 6 schematically illustrates a method wherein a tissue separating device is used to separate an intestine from tissue.

FIG. 6 illustrates a method of separating tissue 5 from an intestine 2 from an animal, in particular porcine, ovine or bovine. The intestine 2 is connected to a cluster of organs 3 laying on a table or other support structure by the tissue 5. The cluster of organs 3 may also by hung from a hook, rail, or other hanging device, possibly a conveyable hanging device.

The intestine 2 is moved in its longitudinal direction relative to a guiding device 6, such that the tissue 5 attached to the intestine 2 is guided into a gap 11 of the guiding device 6. The guiding device may be part of a tissue separating device 1 as described elsewhere in this disclosure. The longitudinal movement of the intestine 3 with respect to the guiding device 6 is achieved by pulling on the intestine 2.

At least one guiding surface 16, 17 of the guiding device 6 contacts the intestine 2. The gap 11 is defined by a first guiding member 9 and a second guiding member 10, which guiding members 9, 10 are movable towards and away from each other to vary a width of the gap 11. The first guiding member 9 and the second guiding member 10 are resiliently forced towards each other. The tissue 5 exerts force on at least one of the first guiding member 9 and the second guiding member 10. The width of the gap 11 is then determined by the interplay between the resilient member force and the force of the tissue 5 on at least one of the first guiding member 9 and the second guiding member 10. In the gap, the tissue 5 is separated from the intestine 2 close to the intestine 2, such that very little tissue 5 remains on the intestine 2, and whisker length is minimized. In the embodiment shown, the first guiding member 9 is fixedly mounted to the tissue separation device 1 and the second guiding member 10 is movably mounted to the tissue separating device 1. The resilient member force is provided by a resilient member 12 which acts upon the second guiding member 10.

As explained in detail above, a tissue separating device for separating an intestine from a cluster of organs harvested from an animal, in particular porcine, ovine or bovine, is disclosed, wherein the intestine is connected to the remainder of the cluster through tissue. The tissue separating device comprises a guiding device having at least one guiding surface configured to contact the intestine, and a tissue severing device configured to provide a separation in the tissue close to the intestine. The guiding device further comprises a first guiding member and a second guiding member being movable with respect to each other to define a gap configured to accommodate said tissue. The gap width is variable. The tissue severing device is configured to be operative in the gap, wherein the tissue separating device further comprises a resilient member configured to exert a force on at least one of the first guiding member and the second guiding member, the resilient member force driving the first guiding member and the second guiding member towards each other.

As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. A tissue separating device for separating an intestine from a cluster of organs harvested from an animal, the intestine being connected to the remainder of the cluster through connecting tissue, the tissue separating device comprising:
   a) a guiding device having at least one guiding surface configured to contact the intestine;
   b) a tissue severing device configured to provide a separation in the connecting tissue close to the intestine,
   wherein the guiding device further comprises a first guiding member and a second guiding member being movable with respect to each other to define a gap configured to accommodate said connecting tissue, the gap having a variable gap width, wherein the tissue severing device is configured to be operative in the gap, wherein the tissue separating device further comprises a resilient member configured to exert a resilient member force on at least one of the first guiding member and the second guiding member, the resilient member force driving the first guiding member and the second guiding member towards each other.

2. The tissue separating device according to claim 1, wherein the first guiding member and the second guiding member are rotatable relative to each other to vary the gap width.

3. The tissue separating device according to claim 1, wherein the first guiding member is fixed with respect to the tissue severing device and the second guiding member is movable with respect to the tissue severing device.

4. The tissue separating device according to claim 1, wherein the second guiding member is rotatable around a guiding member rotation axis.

5. The tissue separating device according to claim 3, wherein the resilient member is configured to exert a force on the second guiding member such that the second guiding member is forced towards the first guiding member to minimize the gap width.

6. The tissue separating device according to claim 1, wherein the force exerted by the resilient member is adaptable.

7. The tissue separating device according to claim 1, wherein the resilient member is a spring.

8. The tissue separating device according to claim 7, wherein the force exerted by the spring may be adapted by changing the pre-tension of the spring.

9. The tissue separating device according to claim 1, wherein the gap formed by the first guiding member and the second guiding member comprises a tapering tissue inlet area.

10. The tissue separating device according to claim 9, wherein the first guiding member and the second guiding member each comprise a rounded end portion at a tissue inlet area of the gap.

11. The tissue separating device according to claim 1, wherein the first guiding member comprises a first guiding surface, and the second guiding member comprises a second guiding surface, wherein the first guiding surface and the second guiding surface are configured to at least partially contact the intestine.

12. The tissue separating device according to claim 1, wherein the first guiding member comprises a first side facing a second side of the second guiding member, the first side and the second side together defining the gap.

13. The tissue separating device according to claim 1, comprising a stop member for limiting a movement of the first guiding member and the second guiding member towards each other.

14. The tissue separating device according to claim 1, comprising a stop member for limiting a movement of the first guiding member and the second guiding member away from each other.

15. The tissue separating device according to claim 1, wherein the tissue severing device comprises a rotatably driven cutting member.

16. The tissue separating device according to claim 15, wherein the cutting member is a circle knife having a peripheral cutting edge.

17. The tissue separating device according to claim 16, wherein the cutting edge is plain.

18. The tissue separating device according to claim 16, wherein part of the cutting edge extends across the gap.

19. The tissue separating device according to claim 15, wherein the cutting member extends in a plane extending at an angle between 20° and 60° to the guiding surface of the guiding device.

20. The tissue separating device according to claim 1, further comprising a fluid supply duct configured to supply fluid to the tissue severing device.

21. The tissue separating device according to claim 15, wherein the cutting member is driven by an electric motor.

22. The tissue separating device according to claim 21, wherein the electric motor is directly coupled to the cutting member.

23. A method of separating an intestine from a cluster of organs harvested from an animal, the intestine being connected to the remainder of the cluster through connecting tissue, the method comprising:
   a) moving the intestine in its longitudinal direction relative to a guiding device;
   b) guiding the connecting tissue into a gap of the guiding device, wherein the guiding device comprises a first guiding member and a second guiding member defining the gap, and being movable towards and away from each other to vary a width of the gap, wherein the first guiding member and the second guiding member are resiliently forced towards each other by a resilient member force, and wherein at least one guiding surface of the guiding device contacts the intestine;
   c) allowing the connecting tissue to exert a force on at least one of the first guiding member and the second guiding member, wherein the gap width is determined by the interplay between the resilient member force and the force exerted by the connecting tissue; and
   d) providing, in the gap, a separation in the connecting tissue close to the intestine.

24. The method according to claim 23, wherein the first guiding member is rigidly mounted to a tissue separation device, wherein the second guiding member is movably mounted to the tissue separating device, and wherein the resilient member force is provided by a resilient member which acts upon the second guiding member.

* * * * *